United States Patent [19]

De Rossett, Jr.

[11] Patent Number: 4,985,115

[45] Date of Patent: Jan. 15, 1991

[54] METHOD FOR ETCHING GLASS

[76] Inventor: Thomas De Rossett, Jr., 10551 Morada Dr., Orange, Calif. 92669

[21] Appl. No.: 395,013

[22] Filed: Aug. 16, 1989

Related U.S. Application Data

[63] This application is a continuation-in-part of Ser. No. 189,119, filed May 2, 1988 now abandoned.

[51] Int. Cl.$^5$ .................. B44C 1/22; C03C 15/00; C03C 25/06
[52] U.S. Cl. ........................ 156/654; 65/31; 156/657; 156/659.1; 156/663
[58] Field of Search ............ 156/631, 633, 645, 654, 156/655, 657, 659.1, 663; 65/31; 101/127, 128.21, 128.4, 129

[56] References Cited

U.S. PATENT DOCUMENTS

| | | | |
|---|---|---|---|
| 4,316,766 | 2/1982 | Levin et al. | 156/631 |
| 4,401,745 | 8/1983 | Nakane et al. | 430/197 |
| 4,460,621 | 7/1984 | Pearlman | 427/64 |
| 4,585,514 | 4/1986 | Scallan | 156/631 |
| 4,652,337 | 3/1987 | Picone et al. | 154/654 |
| 4,657,632 | 4/1987 | Holtzman | 156/659.1 |

OTHER PUBLICATIONS

Bar Code Symbology-Some Observations on Theory and Practice (1984).

*Primary Examiner*—William A. Powell
*Attorney, Agent, or Firm*—Plante, Strauss, Vanderburgh & Connors

[57] ABSTRACT

A method is disclosed for etching glass surfaces, particularly the windows of vehicles, which includes the steps of preparing a graphic image including a bar code; transferring the image to a tissue stencil by means of a plurality of cylindrical rods; applying the stencil over a glass surface to be etched; applying an etchant in a defined pattern across the rear surface of the stencil; applying a nearly uniform pressure to the etchant to distribute the etchant over the rear surface of the stencil and to force it through the impressions in the stencil to etch the image onto the glass surface and removing the stencil and residue left on the surface being etched leaving the image etched in the surface of the glass. The etched image is read by a CCD scanner to recover the information represented by the bar code.

In its preferred form, this process further includes the step of coating the etched surface with a light reflective material which is subsequently removed from the non-etched portions of the glass but which remains in the etched portions to provide a light reflective image which can be read by a bar code reader directly into a computer.

17 Claims, No Drawings

METHOD FOR ETCHING GLASS

RELATIONSHIP TO PENDING APPLICATIONS

This application is a continuation-in-part of co-pending application Ser. No. 189,119, filed May 2, 1988, now abandoned.

FIELD OF THE INVENTION

This invention relates to a method for etching glass and, more particularly, to a method for etching glass surfaces with indicia representing data which is subsequently read out from the etched indicia.

BACKGROUND OF THE INVENTION

It has long been known to etch automobile identification numbers into windshields and other glass surfaces of automobiles for the purpose of deterring theft. Historically, this involved sandblasting as illustrated in U.S. Pat. No. 4,048,918 to Peck or acid etching through a stencil utilizing an impermeable plastic film. Such stencils have been cut using a spark-discharge method as disclosed in U.S. Pat. No. 4,316,766 to Levin et al or a hot die cutting method as disclosed in U.S. Pat. No. 4,415,284 to Floyd. Although these stencil cutting processes work, they are slow and costly and there is no known way to automate their use.

Automation of the preparation of such stencils is of great importance to avoid etching erroneous identification numbers on to automobiles and the like. It has been reported by the General Accounting Office of the U.S. government that as many as seven percent of the vehicle identification numbers entered into the National Crime Information Center database have been incorrect. Inasmuch as the etched indicia are nearly impossible to remove, the use of better verification methods has become necessary. To this end, the National Auto Theft Bureau has recently adopted a standard for vehicle identification for verifying the entry of vehicle identification numbers into data terminals and public domain software has recently become available for utilizing this standard. Consequently, the means for automatically verifying and providing numbers for etching now exist but on for the production of the stencils themselves.

Recently, a method has been devised which is capable of utilizing the available computer software for generating stencils. This system is disclosed in U.S. Pat. No. 4,585,514 to Scallon. The system utilizes a nitrocellulose tissue stencil in association with a mechanical type-shaped hammer for cutting alpha numeric stencils in response to vehicle identification data provided by a computer. Unfortunately, the method used by the system does not reliably produce acceptable identification numbers and is unsuited for etching additional coded information relating to the automobile, such as information in the form of a bar code which can be read into a computer by a bar code reader.

SUMMARY OF THE INVENTION

It is an object of this invention to provide an improved system for etching coded information onto the glass surfaces of a vehicle.

It is yet another object of this invention to provide an improved method for preparing stencils from computer generated graphic images.

It is an additional object of this invention to provide a method for permanently and accurately affixing identification data to a vehicle.

It is a further object of this invention to provide a method for permanently affixing to motor vehicles coded information in the form of a bar code which is capable of being machine read.

These and other objects of the invention are accomplished by a method for etching glass surfaces which includes the steps of preparing a graphic image including a bar code; transferring the image to a tissue stencil by means of a plurality of cylindrical rods; applying the stencil over a glass surface to be etched; applying an etchant in a defined pattern across the rear surface of the stencil; applying a nearly uniform pressure to the etchant to distribute the etchant over the rear surface of the stencil and to force it through the impressions in the stencil to etch the image onto the glass surface and removing the stencil and residue left on the surface being etched leaving the image etched in the surface of the glass.

In its preferred form, this process further includes the step of coating the etched surface with a light reflective material which is subsequently removed from the un-etched portions of the glass but which remains in the etched portions to provide a light reflective image which can be read by a bar code reader directly into a computer.

The method described in the following specification is suitable for use over a wide range of temperatures and humidities.

Other objects, features, and advantages of the invention will become apparent upon reference to the specification and the detailed description contained therein.

DESCRIPTION OF THE PREFERRED EMBODIMENT

The initial step of the invention involves the generation of a graphic image representing a bar code. The bar code represents the quickest, most easily automated and most error free way of reading information into a computer file. The graphic image may also include directly human readable images such as, for example, an alphanumeric code representing the vehicle identification number which can be read directly without the aid of a bar code reader and decoder device. The bar code lends itself to automated methods for creating the image and for verifying the information that is represented by the bar code. It should be pointed out that verification of the information utilized to create identification numbers for automobiles and the like is highly important. It has been reported by the General Accounting Office of the U.S. Government that as many as 7% of the vehicle identification numbers entered into the National Crime Information Center Data Base have been incorrect. Inasmuch as the etched indicia are nearly impossible to remove, the use of automated verification methods has become necessary. To this end, the National Auto Theft Bureau has recently adopted a standard for vehicle verification for verifying the entry of the vehicle identification numbers into data terminals. Public domain software has recently become available for utilizing this standard.

As will be explained below, the conditions under which the information must be read from a bar code etched in a glass surface make the use of conventional bar code reading devices extremely difficult and there is a relatively high error in information read from such bar codes utilizing conventional bar codes and conventional bar code readers. Consequently, it is highly preferred that the bar code graphic be formed as a negative or reverse bar code. The negative image works best because bar code readers are designed to sense the duration of a period during which reflected light is interrupted or absorbed. Consequently, conventional bar codes as printed on labels have a highly reflective background while the bars themselves are highly absorptive. However, the situation is somewhat different when a conventional bar code reader is utilized to read a bar code from a glass surface since the glass, even at the etched portion, permits a substantial amount of the emitted light from the reader to pass through so that only a very small amount of light is reflected back to the bar code sensors resulting in no readings or erroneous readings. By using a negative of the bar code, the spaces between the bars are actually etched while the bars themselves are not etched. As will be explained in more detail below, this, in combination with another step of the method, presents an image in which the bars absorb light and the spaces reflect light, much in the same manner as a conventionally printed bar code. It is also necessary to etch leading and trailing blocks or "quiet zones" to the immediate left and right of each line of bar code indicia. The quiet zones designate to a scanner the beginning and the end of a line of bar code and thus must reflect light in the same manner as the spaces between the individual bars. The quiet zone defines an etched block of at least ¼ inch in width and of the same height as the bars in order to be compatible with the parameters of the scanners used to read the bar codes in accordance with the invention.

Due to the reflective qualities of reverse bar codes etched in glass, it has been found that with industry standard bar code formats, such as Code 39, best results are achieved when the number of characters in a line are limited to about 9 characters. Consequently, in the case of VIN numbers which are 17 characters in length, it is necessary to divide the bar code into two lines of 9 characters each. It has been found that bar code scanners or readers cannot accurately read a glass etched reverse bar code which contains more than 9 characters. Preferably the bar code lines are vertically arranged and the second bar code line is provided with a signal character, such as a "/", to indicate that the data from both lines must be linked into a single data message. The software interpreting the data from the scanner is readily programmed to recognize the linking signal and to properly arrange the data from each line in the proper order regardless of the order in which the bar code lines are scanned. The second step of the invention involves the preparation of the stencil itself utilizing the cylindrical rods of a dot matrix printer to transfer the graphic generated image to the stencil. The preferred stencil material comprises nitro-cellulose tissue having a heavily plasticized layer of highly filled resin calendared onto a non-woven nitro cellulose carrier web. The plasticized layer is resistant to the etching material to be used. The graphically generated image is transferred to the stencil by removing portions of the plasticized layer in those areas in which contact between the etchant and the glass surfaced is desired. The cylindrical rods of the dot matrix printer, being of relatively small diameter, penetrate the stencil from the back or non-contact side of the stencil material and selectively force the plasticized layer from the stencil material in the area of cylinder penetration. The flexibility of a dot matrix printer or similar printer utilizing small diameter cylindrical rods, makes it ideally suited to generate the negative image of the bar code in the stencil material. It is not essential that the rods cut through the fibrous portion of the tissue although if fibers are removed good results are still achieved. Much of the plasticized material residue formed during image generation is forced onto the surface of a protective layer of material which is provided over the contact surface of the stencil material and which is removed prior to use to expose the contact surface of the stencil. Much of the residue is thus carried away when the protective layer is removed for the actual etching step. Consequently the resultant etched image is sharp and well defined and not blurred by residue plasticized material left from the stencil preparation which further aids in reading information in from the bar code.

A further advantage of the use of a dot matrix printer is that it is readily controlled by a computer so that computer generated graphic images can be accurately generated in a stencil, thus illuminating the necessity of any intervening manual steps in the production of the stencil itself.

Following preparation of the stencil in the manner described above, the next step involves the etching operation itself. The protective layer is removed from the contact surface of the stencil and the stencil is lightly wetted with water and laid against the glass surface to be etched. The etchant is applied as a gel or paste to the rear surface of the stencil in a defined pattern, such as a band or ribbon, using a suitable applicator, for example a syringe, and is pressed evenly into the stencil by the application of the backing material over the rear surface of the stencil. Best results are achieved utilizing means to distribute the etchant evenly over the indicia impressions and to force it there through into contact with the glass such as for example by running a finger across the backing material to evenly distribute the etchant over the indica impressions. The stencil is left in place for approximately three minutes, then removed and the residue washed away from the glass in a well known manner.

Any suitable glass etching material may be utilized as the etchant in the method of the present invention. However it is highly preferred that the etchant be relatively viscus since the majority of the surfaces to be etched will be in a generally vertical orientation and etchant compositions of low viscosity will be difficult to use in such situations. Furthermore, low viscosity etchants must be applied with a brush or similar applicator which involves physical contact between the applicator and the stencil and a high risk of damage to the stencil. Even the slightest abrasion of a stencil can alter the quality of the etched characters, producing an asthectic imperfection and rendering the etched bar code incapable of being accurately scanned. Other methods of application, such as spraying, are inapplicable due to the danger of injury to the operator and damage to the object being etched.

A preferred etchant comprises a mixture of ammonia fluoride, barium sulphate and glycerine which is prepared by mixing while being warmed in a copper vessel. The resultant etchant is relatively viscus and is conveniently supplied in a container similar to a container used with a caulking gun. The container is preferably provided with a suitable nozzle so that the application of light pressure on the rear portion of the container will extrude etchant in a uniform pattern through the nozzle onto the stencil material. In this fashion the amount of etchant material applied is readily controlled and the danger to the operator by splattering or accidental spills is avoided.

As previously mentioned, the conditions under which the bar code will be read will be severe because of the non-reflective nature of the glass and because often the readings will take place out-of-doors in broad daylight. Consequently the final step in preparing the etched image involves highlighting of the image with a light-reflective material. This is best accomplished by use of a single phase, white epoxy resin ink. The resin ink is applied over the area of the glass which has been previously etched, then heated to a temperature of about 350° for approximately 30 seconds using a commercially available heat gun. The surrounding glass retains sufficient heat to permit the epoxy resin to harden and to bond to the etched portion of the glass. After several minutes the epoxy is removed from the unetched portion of the glass by running a blade over the glass surface. The white epoxy remains in the etched portions to provide reflective highlighting of the image.

It is highly preferred that the bar code images prepared as described above also include human readable indicia as well as coded information. For this reason alpha numeric characters are formed in the stencil and etched into the glass surface in the same manner as the bar code. The alpha numeric characters are created graphically and encoded into the stencil simultaneously with the bar code to insure accurate placement of the characters with corresponding portions of the bar code. This also eliminates the unnecessary steps of producing a second stencil and a second etching operation. The alpha numeric characters need not be highlighted in the manner described for the bar code since they can be seen with the human eye. However, if desired, the alpha numeric characters may also be highlighted simultaneously with the bar code.

The bar code is automatically read by a charge coupled bar code reader (CCD scanner) which utilizes a plurality of diodes which are positioned immediately adjacent to the glass surface during the code reading process. These devices are superior to the conventional helium neon infrared laser readers for the purposes of the present invention because the laser bar code readers must be aimed at the image and it has been found that the infrared laser beam is washed out in daylight so that aiming the device is extremely difficult if not impossible. Moreover, the CCD scanner is not as sensitive to background lighting and does not need to be aimed so that as the reading head of the bar code reader is brought into close proximity to the image the diodes will pick up the reflected light. As previously mentioned, the image actually etched is a negative of the conventional bar code and the highlighted portions of the image actually represent the spaces of a conventionally printed bar code. Consequently light is reflected by the spaces while it passes through the unetched portions and is sensed by the bar code reader as being absorbed. CCD scanners modified for use in the present invention are distributed by AG Systems, 19762 MacArthur Blvd., Irvine, Calif. The programs and algorithms used for for the reading and interprtation of data from conventional bar codes are suitable for use in reading the glass etched bar codes of the invention with modifications readily apparent to those skilled in the art and do not per se form a part of this invention.

Although CCD scanners are preferred for use in the present invention, neon infrared laser bar code readers may also be utilized to read the bar code under proper conditions such as indoors with light conditions which permit the operator to see and aim the helium laser beam emitted by the reader. However, with helium laser beams there is a strong tendency for the laser beam to reflect off the unetched portions of the glass as well as the highlighted etched portions due to the intensity of the beam. Such unwanted reflections unless screened or filtered will result in an unacceptably high read rate error.

It should also be pointed out that the etched bar code image may also be a positive image of the bar code with an absorbant highlight composition disposed in the etched bars. In this case best results are obtained by placing a light reflective decal or label behind the etched image to reflect light back to the bar code reader.

Unhighlighted bar codes etched in glass (both negative and positive images) have been read with both CCD scanners and helium neon scanners under limited lighting conditions with relatively high read errors. Although improvements in the equipment used for scanning the bar codes, at present it is highly preferred to highlight the etched bar code image in the manner already described to avoid unnecessarily high read errors. The highlighting materials are highly resistant to weather and they appear merely as frosted etched images similar to images that are already in automobile windshields and the like. Consequently the highlighting does not detract from the appearance of the automobile.

As will be understood by those skilled in the art, various arrangements other than those described in detail in the specification will occur to those persons skilled in the art, which arrangements lie within the spirit and scope of the invention. It is therefore to be understood that the invention is to be limited only by the claims appended hereto.

What is claimed is:

1. An improved method for storing coded information onto a glass surface for subsequent retrieval by etching said information in coded format into said glass surface and subsequently reading said image to retreive and decode said information, said method comprising the steps of:
    a. generating a graphic image including a bar code to be etched into said glass surface, said bar code representing said information to be stored;
    b. transferring said image to a tissue stencil including an etch resistant barrier by selectively perforating said etch resistant barrier by means of a plurality of cylindrical rods;
    c. applying said stencil including said image over said glass surface to be etched;
    d. applying an etchant in a defined pattern across the rear surface of said stencil;
    e. applying a nearly uniform pressure to the etchant to distribute the etchant over the rear surface of said stencil to force said etchant through the perforations in said etch resistant barrier of said stencil into contact with said glass surface thereby to etch said glass surface; and
    f. removing said stencil and residue left on the surface being etched leaving said image etched in the surface of the glass.

2. The improved method of claim 1 further including the step of coating said surface of said glass into which said image is etched with a material which affects the reflectivity of light and subsequently removing said material from the unetched portions of said glass surface thereby to highlight said image with said material to enhance the readability thereof with light emitting and sensing devices.

3. The improved method of claim 2 wherein said material is light reflective.

4. The improved method of claim 3 wherein said material comprises a single phase epoxy including a light reflective pigment.

5. The improved method of claim 2 wherein said material is light absorbent.

6. The improved method of claim 1 further including the step of directing a beam of electromagnetic energy at said etched image and detecting the pattern of energy reflected from said image and decoding said pattern to obtain a reading of the data represented by said image.

7. The improved method of claim wherein said graphic image generated is that of a bar code representing information to be stored on said glass surface.

8. The improved method of claim 6 wherein said graphic image includes directly human readable alpha numeric indicia.

9. The improved method of claim 6 wherein said image generated is a negative image of said bar code.

10. The improved method of claim 9 wherein said image is highlighted with a single phase epoxy containing composition including a light reflective pigment.

11. The improved method of claim 1 wherein said image is computer generated and verified thereby to insure that the information that said image represents is accurate.

12. The improved method of claim 1 wherein said bar code contains up to nine characters of information.

13. The improved method of claim 12 wherein said image generated comprises at least two bar code lines of up to nine characters each, said bar code lines being vertically aligned thereby to provide an image representing more than nine characters and signal means are provided in at least one of said bar code lines to indicate the proper order in which said characters are to be linked during said reading opoeration to obtain the correct data message.

14. The improved method of claim 1 wherein said glass surface to be etched comprises a portion of at least one window of a motor vehicle and the image etched thereon includes two vertically arranged bar code lines of nine characters each, said bar code lines containing the identification number of said vehicle.

15. The improved method of claim 1 wherein said image is transferred to said tissue stencil by selectively perforating said etch resistant barrier by means of a dot matrix printer.

16. The improved method of claim 1 wherein said etchant is a viscous gel and is applied in a defined pattern to the rear surface of said stencil.

17. The improved method of claim 16 wherein said etchant is supplied in a container having a nozzle and is applied to the rear surface of said stencil by the application of pressure to said container to extrude said etchant through said nozzle in a defined pattern.

* * * * *

UNITED STATES PATENT AND TRADEMARK OFFICE
CERTIFICATE OF CORRECTION

PATENT NO.   : 4,985,115

DATED        : January 15, 1991

INVENTOR(S)  : Thomas De Rossett, Jr.

It is certified that error appears in the above-identified patent and that said Letters Patent is hereby corrected as shown below:

Column 7, Claim 7, Line 1 insert after "Claim" --1--

Signed and Sealed this

Fourth Day of August, 1992

Attest:

DOUGLAS B. COMER

*Attesting Officer*  *Acting Commissioner of Patents and Trademarks*